(12) United States Patent
Jeong et al.

(10) Patent No.: US 11,614,164 B2
(45) Date of Patent: *Mar. 28, 2023

(54) APPARATUS FOR CONTROLLING PULLEY OF CONTINUOUSLY VARIABLE TRANSMISSION AND METHOD THEREFOR

(71) Applicants: Hyundai Motor Company, Seoul (KR); Kia Corporation, Seoul (KR)

(72) Inventors: Dong Hoon Jeong, Hwaseong-si (KR); Byeong Wook Jeon, Seoul (KR); Yong Uk Shin, Seongnam-si (KR); Min Jae Chai, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,790

(22) Filed: Dec. 7, 2021

(65) Prior Publication Data
US 2022/0403930 A1    Dec. 22, 2022

(30) Foreign Application Priority Data

Jun. 18, 2021   (KR) .............................. 2021-0079509

(51) Int. Cl.
*F16H 61/662*   (2006.01)
*F16H 59/44*    (2006.01)
(Continued)

(52) U.S. Cl.
CPC ........... *F16H 61/662* (2013.01); *F16H 59/44* (2013.01); *F16H 59/48* (2013.01); *F16H 59/66* (2013.01);
(Continued)

(58) Field of Classification Search
CPC .......... F16H 59/44; F16H 59/48; F16H 59/54; F16H 59/66; F16H 2059/605;
(Continued)

(56) References Cited

U.S. PATENT DOCUMENTS 11,499,630 B1    11/2022  Jeong et al.
2020/0318698 A1*  10/2020  Bosscher ................ F16D 48/06
(Continued)

FOREIGN PATENT DOCUMENTS

KR       20220036200 A    3/2022
KR       20220080574 A    6/2022
KR    10-2022-0163201 A   12/2022

*Primary Examiner* — Edwin A Young
(74) *Attorney, Agent, or Firm* — Morgan, Lewis & Bockius LLP

(57) ABSTRACT

An apparatus of controlling a pulley of a continuously variable transmission and a method therefore is provided. The apparatus includes a non-transitory storage configured for storing a deep learning model, learning of which is completed and a controller that predicts a vehicle speed and an accelerator position sensor (APS) value for each future time point based on the deep learning model and controls the pulley of the continuously variable transmission based on a pulley ratio for each future time point, the pulley ratio corresponding to the predicted vehicle speed and the predicted APS value, thus preventing a reverse control phenomenon of the pulley ratio and increasing a tension of the belt in the continuously variable transmission.

16 Claims, 8 Drawing Sheets

(51) Int. Cl.
*F16H 59/48* (2006.01)
*F16H 59/66* (2006.01)
*F16H 59/60* (2006.01)
*F16H 59/58* (2006.01)
*F16H 59/54* (2006.01)
*F16H 59/70* (2006.01)

(52) U.S. Cl.
CPC .............. *F16H 59/54* (2013.01); *F16H 59/58* (2013.01); *F16H 2059/605* (2013.01); *F16H 2059/663* (2013.01); *F16H 2059/704* (2013.01); *F16H 2061/66295* (2013.01)

(58) Field of Classification Search
CPC ......... F16H 2059/663; F16H 2059/704; F16H 61/662; F16H 2061/66295
See application file for complete search history.

(56) References Cited

U.S. PATENT DOCUMENTS

| | | | |
|---|---|---|---|
| 2022/0034400 A1* | 2/2022 | Miller | F16H 61/32 |
| 2022/0067023 A1* | 3/2022 | Serout | G06F 21/552 |
| 2022/0080980 A1 | 3/2022 | Jeong et al. | |
| 2022/0178439 A1 | 6/2022 | Jeong et al. | |
| 2022/0390007 A1 | 12/2022 | Jeong et al. | |

\* cited by examiner

APPARATUS FOR CONTROLLING PULLEY OF CONTINUOUSLY VARIABLE TRANSMISSION AND METHOD THEREFOR

CROSS-REFERENCE TO RELATED APPLICATION

The present application claims priority to Korean Patent Application No. 10-2021-0079509, filed on Jun. 18, 2021, the entire contents of which is incorporated herein for all purposes by this reference.

BACKGROUND OF THE INVENTION

Field of the Invention

The present invention relates to technologies of predicting a pulley ratio for each future time point and controlling a pulley of a continuously variable transmission based on the predicted pulley ratio for each future time point.

Description of Related Art

In general, a continuously variable transmission may include a drive pulley, a driven pulley, and a belt, which may control oil pressure supplied to the drive pulley and the driven pulley to move the drive pulley and the driven pulley in a shaft direction, thus continuously changing a pulley ratio (a transmission ratio) by a change in diameter of a contact surface between the belt and the drive pulley and a change in diameter of a contact surface between the belt and the driven pulley.

Such a continuously variable transmission may obtain a continuous transmission ratio to enhance power transfer efficiency, have no shift shock while driving, improve fuel efficiency of the vehicle, and maintain an optimal driving state.

Such an existing technology of controlling the pulley of the continuously variable transmission is a method of adjusting a pulley ratio based on a demand power corresponding to a vehicle speed and the amount of accelerator pedal (an accelerator position sensor (APS) value). The existing technology decreases a pulley ratio (under drive) to lower revolutions per minute (RPM) of a power source to decrease an output power, when the demand power is low, and increases a pulley ratio (overdrive) to increase an RPM of the power source, when the demand power is high.

Such an existing technology causes a pulley ratio reverse control phenomenon of controlling a pulley in a direction of decreasing the pulley ratio and immediately controlling the pulley in a direction of increasing the pulley ratio, when a future demand power is higher than a current demand power, and increases a pulley ratio in a state where a high load is loaded onto the belt as the demand power is increased in advance to increase a tension of the belt.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus of controlling a pulley of a continuously variable transmission for predicting a vehicle speed and an accelerator position sensor (APS) value for each future time point based on a deep learning model, the learning of which is completed and controlling the pulley of the continuously variable transmission based on a pulley ratio for each future time point, corresponding to the predicted vehicle speed and the predicted APS value, to prevent a reverse control phenomenon of the pulley ratio and prevent a tension of a belt in the continuously variable transmission from being increased and a method therefor.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains. Furthermore, it may be easily seen that purposes and advantages of the present invention may be implemented by means indicated in claims and a combination thereof.

According to various aspects of the present invention, an apparatus of controlling a pulley of a continuously variable transmission may include a non-transitory storage configured for storing a deep learning model, learning of which is completed and a controller that predicts a vehicle speed and an accelerator position sensor (APS) value for each future time point based on the deep learning model and controls the pulley of the continuously variable transmission based on a pulley ratio for each future time point, the pulley ratio corresponding to the predicted vehicle speed and the predicted APS value.

In various exemplary embodiments of the present invention, the controller may maintain a current pulley ratio during a reference time, when a number of pulley ratios higher than the current pulley ratio above a threshold among pulley ratios for every future time points is greater than a reference value, at a downward control time point of the current pulley ratio.

In various exemplary embodiments of the present invention, the controller may upwardly control a current pulley ratio, when a number of pulley ratios higher than a current pulley ratio above a threshold among pulley ratios for every future time points is greater than a reference value, in a state where a current gear stage is maintained.

In various exemplary embodiments of the present invention, the controller may increase the current pulley ratio in proportion to the APS value.

In various exemplary embodiments of the present invention, the deep learning model may be a variational autoencoder (VAE)-based deep learning model having an encoder configured to receive time series data for a driving profile prior to a predicted time point and a decoder configured to predict a speed of a vehicle and an APS value based on a low-dimensional variable, which is an output of the encoder, and a vehicle speed, an APS value, and a driving profile at the predicted time point.

In various exemplary embodiments of the present invention, the driving profile may include at least one of a gas pedal position (GPP) value, revolutions per minute (RPM), a pulley ratio, a vehicle speed, a gradient of a road, a curvature of the road, a steering angle, a brake pedal position (BPP) value, a separation distance from a preceding vehicle, a relative speed with the preceding vehicle, information related to traffic lights in front, or an APS value.

In various exemplary embodiments of the present invention, the deep learning model may output a vehicle speed in a form of time series data and an APS value in a form of time series data.

In various exemplary embodiments of the present invention, the encoder may model a feature of the time series data for the driving profile prior to the predicted time point as a low-dimensional variable distributed in a first region.

According to various aspects of the present invention, a method for controlling a pulley of a continuously variable transmission may include storing, by a storage, a deep learning model, learning of which is completed, predicting, by a controller, a vehicle speed and an accelerator position sensor (APS) value for each future time point based on the deep learning model, and controlling, by the controller, the pulley of the continuously variable transmission based on a pulley ratio for each future time point, the pulley ratio corresponding to the predicted vehicle speed and the predicted APS value.

In various exemplary embodiments of the present invention, the controlling of the pulley of the continuously variable transmission may include maintaining a current pulley ratio during a reference time, when a number of pulley ratios higher than the current pulley ratio above a threshold among pulley ratios for every future time points is greater than a reference value, at a downward control time point of the current pulley ratio.

In various exemplary embodiments of the present invention, the controlling of the pulley of the continuously variable transmission may include upwardly controlling a current pulley ratio, when a number of pulley ratios higher than a current pulley ratio above a threshold among pulley ratios for every future time points is greater than a reference value, in a state where a current gear stage is maintained.

In various exemplary embodiments of the present invention, the upwardly controlling of the current pulley ratio may include increasing the current pulley ratio in proportion to a change rate of the APS value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
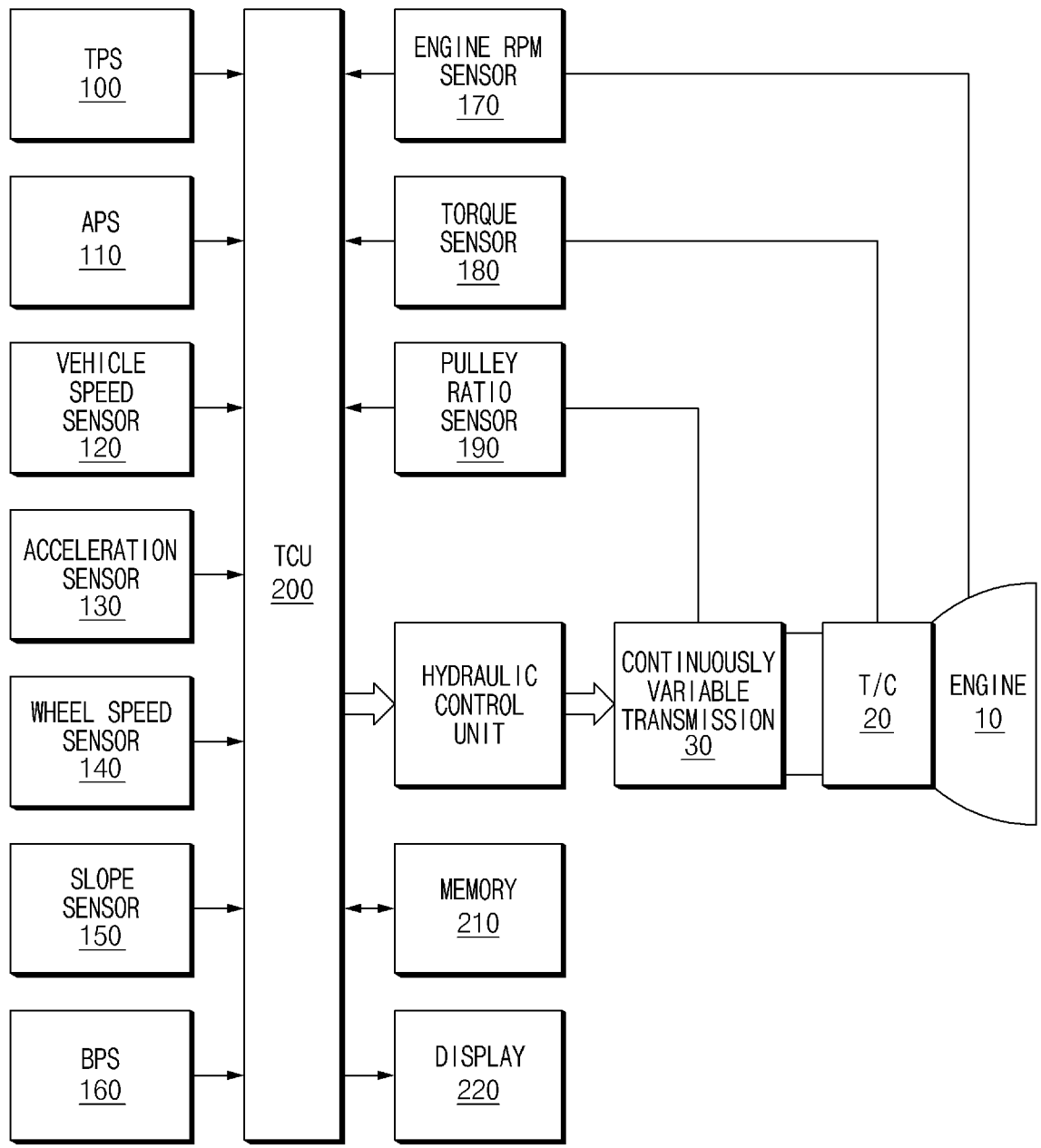
FIG. 1 is a block diagram illustrating a system for controlling a pulley of a continuously variable transmission in a vehicle, to which embodiments of the present invention are applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a system for controlling a pulley of a continuously variable transmission in a vehicle, to which embodiments of the present invention are applied, which illustrates that a power source is an engine 10. However, it is obvious that it is applicable in the same manner when the power source is a motor.

As shown in FIG. 1, the system for controlling the pulley of the continuously variable transmission in the vehicle, to which embodiments of the present invention are applied, may include a throttle position sensor (TPS) 100, an accelerator position sensor (APS) 110, a vehicle speed sensor 120, an acceleration sensor 130, a wheel speed sensor 140, a slope sensor 150, a brake position sensor (BPS) 160, an engine revolutions per minute (RPM) sensor 170, a torque sensor 180, a pulley ratio sensor 190, a transmission control unit (TCU) 200, a memory 210, and a display 220.

Seeing the respective components, first of all, the TPS 100 may detect a throttle position according to an opening and closing amount of a throttle valve of an engine 10 to generate a throttle position sensing signal according to the throttle position. The APS 110 may detect an accelerator position according to a manipulation state of an accelerator pedal of a driver to generate an accelerator position sensing signal according to the accelerator position. The vehicle speed sensor 120 may detect a vehicle speed according to driving of the vehicle to generate a vehicle speed sensing signal according to the vehicle speed. The acceleration sensor 130 may detect a change in longitudinal acceleration according to driving of the vehicle to generate a longitudinal acceleration sensing signal according to the sensed change or may detect a change in lateral acceleration according to driving of the vehicle to generate a lateral acceleration sensing signal according to the sensed change The wheel speed sensor 140 may detect a wheel speed (a speed of a wheel) according to driving of the vehicle to generate a wheel speed sensing signal according to the wheel speed. The slope sensor 150 may detect a slope of a vehicle body according to hill (or curved road) driving of the vehicle to generate a slope sensing signal according to the slope of the vehicle body. The BPS 160 may detect a manipulation state of a brake pedal of the driver to generate a brake position sensing signal according to the manipulation state of the brake pedal. The engine RPM sensor 170 may detect a rotary RPM according to running of the engine 10 to generate an RPM sensing signal according to the rotary RPM. The torque sensor 180 may detect a rotational torque of a torque converter (T/C) 20 combined between the engine 10 and a continuously variable transmission 30 to generate a torque sensing signal according to the rotational torque of the T/C 20. The pulley ratio sensor 190 may detect a manipulation state of a pulley ratio according to shift of the continuously variable transmission 30 to generate a pulley ratio sensing signal according to the manipulation state of the pulley ratio.

Meanwhile, to control shift of the vehicle, the TCU 200 may receive the throttle position sensing signal from the TPS 100, the accelerator position sensing signal from the APS 110, the vehicle speed sensing signal from the vehicle speed sensor 120, the acceleration sensing signal from the acceleration sensor 130, the wheel speed sensing signal from the wheel speed sensor 140, the slope sensing signal from the slope sensor 150, the brake position sensing signal from the BPS 160, the RPM sensing signal from the engine RPM sensor 170, the torque sensing signal from the torque sensor 180, or the pulley ratio sensing signal from the pulley ratio sensor 190.

The TCU 200 may collect data for identifying a road state (e.g., a gradient, a curvature, or the like) and a driving state of the vehicle by the sensing signal from each sensor and may analyze the collected data to classify information. In the instant case, driving information data analyzed by the collected data may include an opening and closing amount of the throttle valve, a position of an accelerator, a current pulley ratio of the continuously variable transmission 30, a vehicle speed, acceleration, an engine RPM, an average vehicle speed, a difference in wheel RPM of a wheel, a slope of the vehicle, an operational period of a brake, a required amount of torque of the engine 10, a curvature of the road, a gradient of the road, or the like. The TCU 200 may adjust a pulley ratio based on the analyzed driving information data. The memory 210 may store various logics, algorithms, and programs necessary for shift. The display 220 may display a current pulley ratio under control of the TCU 200 such that the driver may identify the current pulley ratio.

Figure 2:
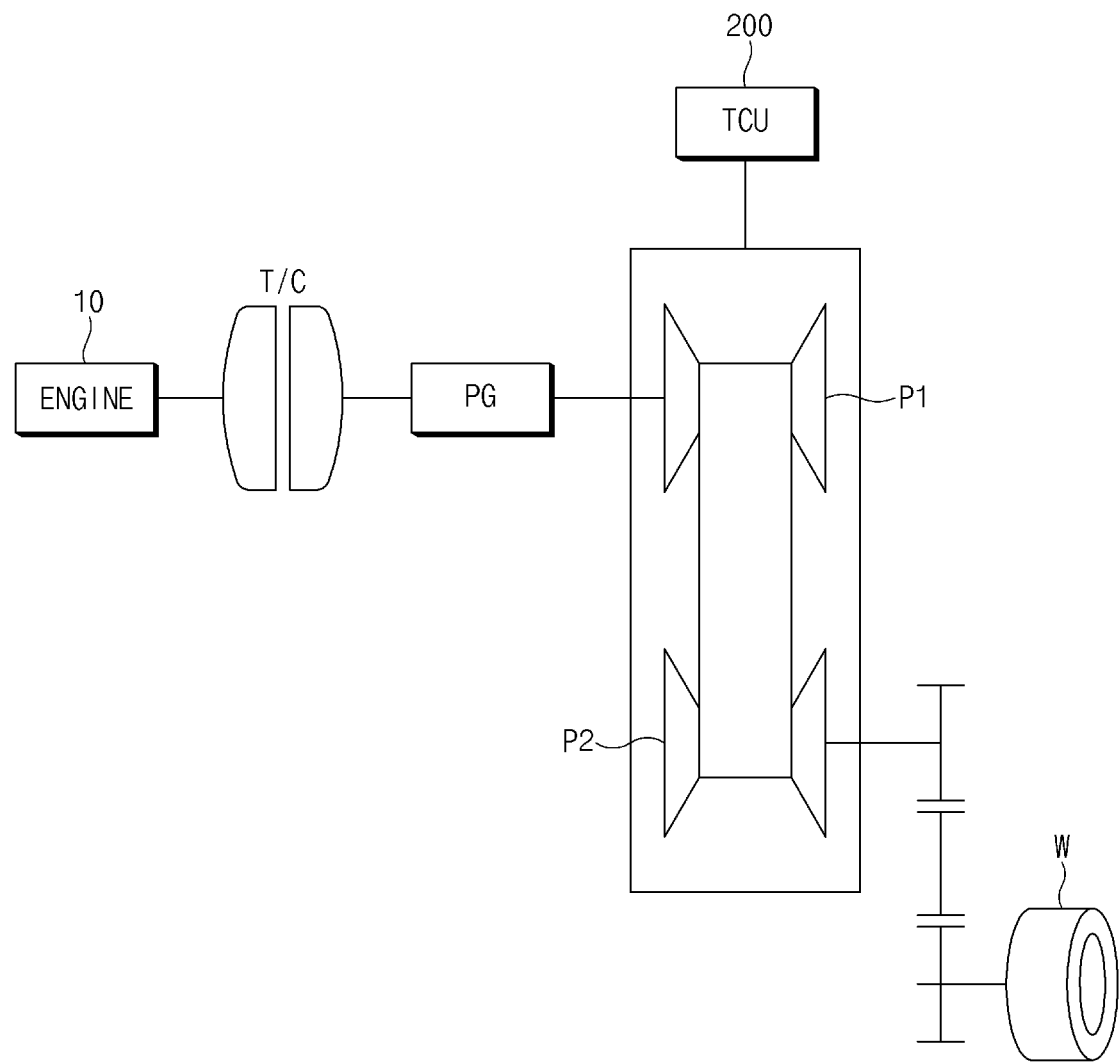
FIG. 2 is a drawing illustrating a continuously variable transmission in a system for controlling a pulley of the continuously variable transmission in a vehicle, to which embodiments of the present invention are applied.

FIG. 2 is a drawing illustrating a continuously variable transmission in a system for controlling a pulley of the continuously variable transmission in a vehicle, to which embodiments of the present invention are applied.

As shown in FIG. 2, a continuously variable transmission 30 in the system for controlling the pulley of the continuously variable transmission in the vehicle, to which embodiments of the present invention are applied, may be composed such that power of an engine 10 is transferred in an order of a T/C 20, a planetary gear PG, a drive pulley P1, a driven pulley P2, a deceleration gear, and a driving wheel W. The power of the engine 10 may be varied to a continuously variable transmission ratio by a pulley to be delivered to the driving wheel W.

Herein, the drive pulley P1 may be connected to the engine 10 and the driven pulley P2 may be connected to the driving wheel W. When static shift in a direction opposite to a driving direction is generated by a driver while driving, a rotation direction of the drive pulley P1 is rapidly changed by power of the engine 10, whereas the driven pulley P2 performs late direction conversion while maintaining its rotation direction by inertia of the driving wheel W, although receiving power through a belt.

Due to the provided configuration, as a tensile force and a compressive force are loaded onto both sides of the belt connecting between the drive pulley P and the driven pulley P2, the belt may slip on the drive pulley P1 and the driven pulley P2 to be damaged. A TCU 200 may upwardly control pressure of the drive pulley P1 and the driven pulley P2, when static shift occurs, to prevent such a belt slip phenomenon. In the instant case, the drive pulley P1 and the driven pulley P2 may be varied and controlled in pressure according to operations of actuators respectively connected thereto. As the actuators apply oil pressure, the TCU 200 may upwardly control the pressure of the drive pulley P1 and the driven pulley P2.

Figure 3:
FIG. 3 is a block diagram illustrating a configuration of an apparatus of controlling a pulley of a continuously variable transmission according to various exemplary embodiments of the present invention.

FIG. 3 is a block diagram illustrating a configuration of an apparatus of controlling a pulley of a continuously variable transmission according to various exemplary embodiments of the present invention.

As shown in FIG. 3, the apparatus of controlling the pulley of the continuously variable transmission according to various exemplary embodiments of the present invention may include a storage 31 and a controller 32. In the instant case, the respective components may be combined into one component and some components may be omitted, depending on a manner which executes the apparatus of controlling the pulley of the continuously variable transmission according to various exemplary embodiments of the present invention.

Seeing the respective components, first of all, the storage 31 may store various logics, algorithms, and programs required in a process of predicting a vehicle speed and an accelerator position sensor (APS) value for each future time point based on a deep learning model, the learning of which is completed, and controlling a pulley of a continuously variable transmission based on a pulley ratio for each future time point, corresponding to the predicted vehicle speed and the predicted APS value. In the instant case, the pulley ratio for each future time point may be predicted by the vehicle speed for each future time point and the APS value for each future time point and may be used to control the pulley of the continuously variable transmission.

Such a storage 31 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The controller 32 may perform the overall control such that respective components may normally perform their own functions. Such a controller 32 may be implemented in a form of hardware, may be implemented in a form of software, or may be implemented in a form of a combination thereof. The controller 32 may be implemented as, but not limited to, a microprocessor.

The controller 32 may perform a variety of control in a process of predicting a vehicle speed and an accelerator position sensor (APS) value for each future time point based on a deep learning model, the learning of which is completed, and controlling a pulley of a continuously variable transmission based on a pulley ratio for each future time point, corresponding to the predicted vehicle speed and the predicted APS value. In the instant case, the controller 32 may predict (determine) a pulley ratio for each future time point based on the predicted vehicle speed and the predicted APS value.

When the number of pulley ratios higher than a current pulley ratio above a threshold among pulley ratios for every future time points is greater than a reference value (e.g., 2) at a downward control time point of the pulley ratio, the controller 32 may maintain the current pulley ratio during a reference time (e.g., one second) to prevent a reverse control phenomenon of the pulley ratio. Herein, downward control of the pulley ratio in a continuously variable transmission 30 of FIG. 1 may correspond to upshift control in a steptronic automatic transmission, and upward control of the pulley ratio in the continuously variable transmission 30 may correspond to downshift control in the steptronic automatic transmission. Furthermore, the pulley ratio indicates the ratio of a diameter of a driven pulley P2 of FIG. 2 to a diameter of a drive pulley P1 of FIG. 2. Furthermore, the pulley ratio higher than the current pulley ratio above the threshold refers to 1.5, when the current pulley ratio is 1.

When the number of pulley ratios higher than the current pulley ratio above the threshold among the pulley ratios for every future pulley ratios is greater than the reference value (e.g., 2) at a time point when the pulley ratio is maintained, the controller 32 may control the continuously variable transmission 30 to perform upward control of the pulley ratio, thus preventing a tension of the belt in the continuously variable transmission 30 from being increased. In the instant case, the controller 32 may increase a pulley ratio in proportion to a change rate of the APS value.

Hereinafter, the operation of the controller 32 will be described in detail with reference to FIG. 4 and FIG. 5.

Figure 4:
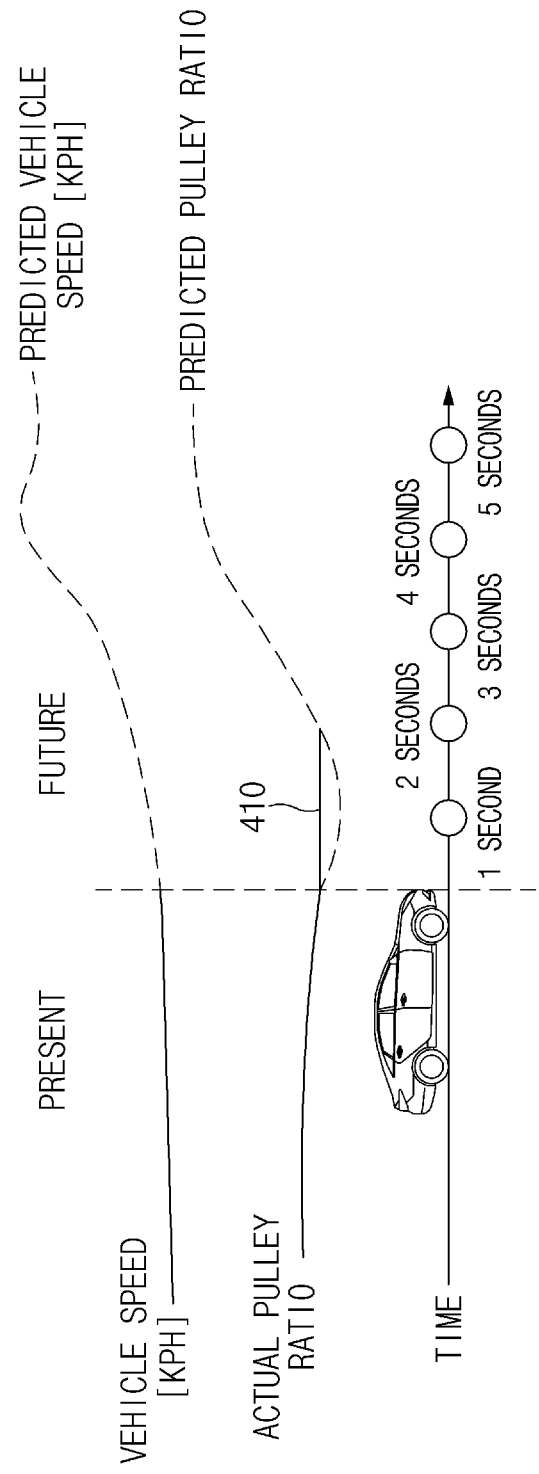
FIG. 4 is a drawing illustrating an operation of a controller provided in an apparatus of controlling a pulley of a continuously variable transmission according to various exemplary embodiments of the present invention.

FIG. 4 is a drawing illustrating an operation of a controller provided in an apparatus of controlling a pulley of a continuously variable transmission according to various exemplary embodiments of the present invention.

As shown in FIG. 4, as pulley ratios for every future time points, for example, a controller 32 of FIG. 3 may predict a pulley ratio after one second based on a vehicle speed after one second and an APS value after one second, may predict a pulley ratio after two seconds based on a vehicle speed after two seconds and an APS value after two seconds, may predict a pulley ratio after three seconds based on a vehicle speed after three seconds and an APS value after three seconds, may predict a pulley ratio after four seconds based on a vehicle speed after four seconds and an APS value after four seconds, and may predict a pulley ratio after five seconds based on a vehicle speed after five seconds and an APS value after five seconds. Herein, both the vehicle speed and the APS value may be predicted values, and the pulley ratio determined based on the vehicle speed and the APS value may also be a predicted value. In the instant case, it is safe for the algorithm of determining the pulley ratio using the vehicle speed and the APS value to use any scheme which is generally known.

Although a downward condition of the pulley ratio is met at a current time point, when the number of pulley ratios higher than a current pulley ratio above a threshold among the predicted five pulley ratios is plural in number, the controller 32 may maintain the current pulley ratio, for example, one second (see reference numeral 410). Thereafter, the controller 32 may predict a pulley ratio for each future time point again at a time point when one second has passed and may control a pulley of the continuously variable transmission based on the predicted pulley ratio.

Figure 5:
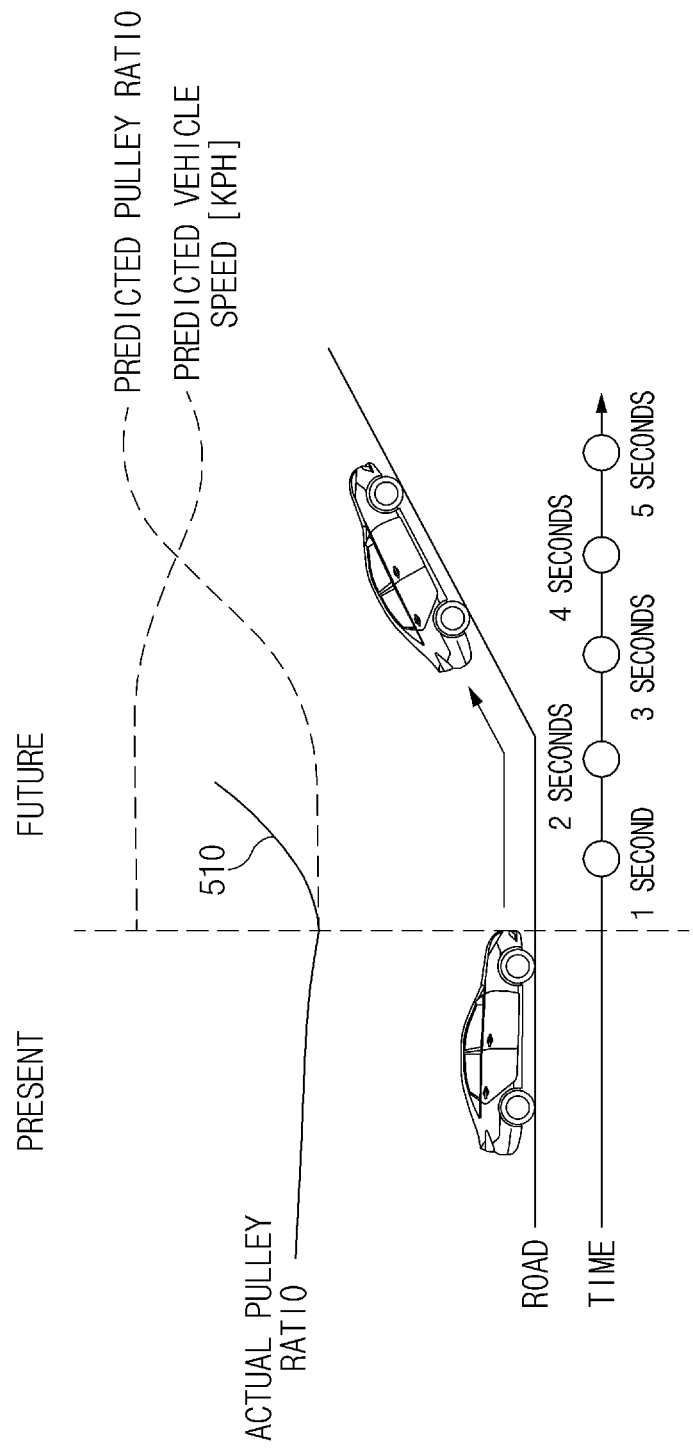
FIG. 5 is a drawing illustrating an operation of a controller provided in an apparatus of controlling a pulley of a continuously variable transmission according to various exemplary embodiments of the present invention.

FIG. 5 is a drawing illustrating an operation of a controller provided in an apparatus of controlling a pulley of a continuously variable transmission according to various exemplary embodiments of the present invention.

As shown in FIG. 5, as pulley ratios for every future time points, for example, a controller 32 of FIG. 3 may predict a pulley ratio after one second based on a vehicle speed after one second and an APS value after one second, may predict a pulley ratio after two seconds based on a vehicle speed after two seconds and an APS value after two seconds, may predict a pulley ratio after three seconds based on a vehicle speed after three seconds and an APS value after three seconds, may predict a pulley ratio after four seconds based on a vehicle speed after four seconds and an APS value after four seconds, and may predict a pulley ratio after five seconds based on a vehicle speed after five seconds and an APS value after five seconds.

In a state where the current pulley ratio is maintained because the current pulley ratio is an optimal pulley ratio, when the number of pulley ratios higher than the current pulley ratio above a threshold among the predicted five pulley ratios is plural in number, the controller 32 may perform upward control of the current pulley ratio (see reference numeral 510). In the instant case, the controller 32 may increase a pulley ratio in proportion to a change rate of the APS value.

Hereinafter, a description will be provided of a process where the controller 32 learns a deep learning model and predicts a vehicle speed and an APS value for each future time point based on the deep learning model, the learning of which is completed. First of all, a storage 31 of FIG. 3 may store a power map in which a demand power corresponding to a vehicle speed and an APS value is recorded and an energy consumption map of a power source for each gear stage.

Figure 6:
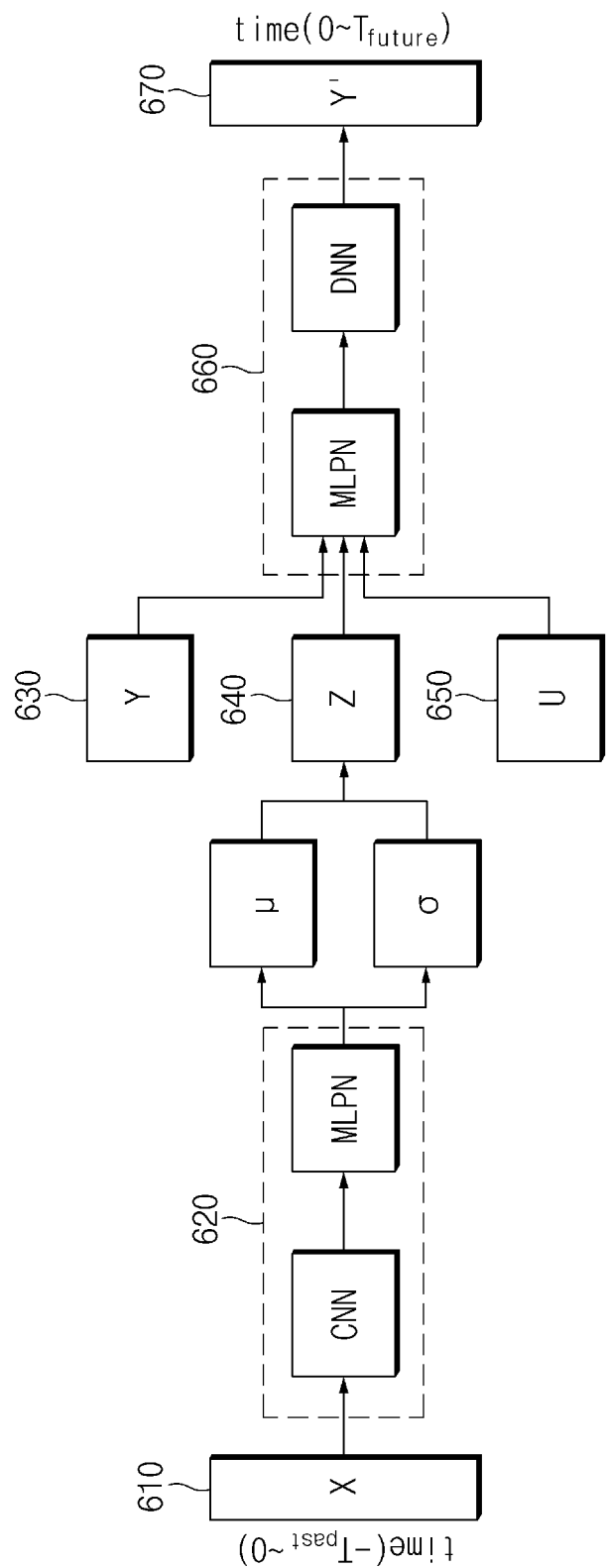
FIG. 6 is a drawing illustrating a deep learning model provided in an apparatus of controlling a pulley of a continuously variable transmission according to various exemplary embodiments of the present invention.

FIG. 6 is a drawing illustrating a deep learning model provided in an apparatus of controlling a pulley of a continuously variable transmission according to various exemplary embodiments of the present invention.

A controller 32 of FIG. 3 may input time series data 610 for a driving profile prior to a predicted time point to an encoder 620 of a variational auto-encoder (VAE), may learn a deep learning model of predicting a speed of a vehicle and an APS value based on a low-dimensional variable Z, which is an output of the encoder 620, a vehicle speed and an APS value at the predicted time point, which are additionally input, and a driving profile at the predicted time, and may predict the speed of the vehicle and the APS value based on the deep learning model, the learning of which is completed.

Herein, the driving profile prior to the predicted time point is a value measured during a certain time prior to the current time point, which refers to information forming a driving pattern of the vehicle. Such a driving profile may include a gas pedal position (GPP) value, revolutions per minute (RPM), a pulley ratio, a vehicle speed, a gradient of a road, a curvature of the road, a steering angle, a brake pedal position (BPP) value (e.g., brake on/off or brake pressure), a separation distance from a preceding vehicle, a relative speed with the preceding vehicle, information related to traffic lights in front, an APS value, or the like. In the instant case, the driving profile is time series data measured during a certain time.

Furthermore, the driving profile at the predicted time point indicates a value measured at the current time point. In the instant case, the GPP value, the RPM, the pulley ratio, the vehicle speed, the steering angle, the BPP value, and the APS value may be obtained over a vehicle network. The gradient and the curvature of the road may be obtained from a navigation device provided in the vehicle. The relative distance from the preceding vehicle and the relative speed with the preceding vehicle may be obtained from a radar provided in the vehicle. The information related to the traffic lights in front (lighting information) may be obtained from a traffic light controller.

In a process of predicting the vehicle speed and the APS value based on the deep learning model, the learning of which is completed, the controller 32 may input time series data for a driving profile prior to the predicted time point to the encoder of the VAE, and may input the low-dimensional variable Z, which is the output of the encoder, the vehicle speed and the APS value at the predicted time point, and the driving profile at the predicted time point to a decoder of the VAE.

As shown in FIG. 6, the controller 32 may learn a VAE-based deep learning model of predicting a speed of the vehicle based on the low-dimensional variable Z, which is the output of the encoder, the vehicle speed and the APS value at the predicted time point, which are additionally input, and the driving profile at the predicted time point.

Reference numeral '620' indicates the probabilistic encoder, reference numeral '610' indicates the time series data X during the reference time ($T_{past}$~$T_{present}$) prior to the predicted time point ($T_{present}$), which is learning data for the driving profile, reference numeral '660' indicates the probabilistic decoder, reference numeral '640' indicates the low-dimensional variable Z which is the output of the encoder, reference numeral '630' indicates the vehicle speed and the APS value at the predicted time point, reference numeral '650' indicates the driving profile at the predicted time point, and reference numeral '670' indicates the predicted speed and the predicted APS value of the vehicle in the future. In the instant case, Y' may be the vehicle speed and the APS value during the reference time ($T_{present}$~$T_{future}$) from the current time point, which may be represented in a form of time series data. Furthermore, µ denotes the average of distribution, and σ denotes the variance of distribution.

The encoder 620 may have a convolutional neural network (CNN) and a multi layer perceptron network (MLPN). The decoder 660 may have a multi layer perceptron network (MLPN) and a deconvolutional neural network (DNN).

For reference, the decoder ($p\theta^{(x|z)}$) may be parameterized by a deep neural network having a parameter θ. The decoder ($p\Phi^{x|z}$) may be parameterized by a deep neural network having a parameter Φ. The low-dimensional variable z is defined to embed compression information of data X. The encoder 620 may map a data space to a potential space. The encoder 620 and the decoder 660 may be parameterized using a diagonal Gaussian distribution.

Figure 7:
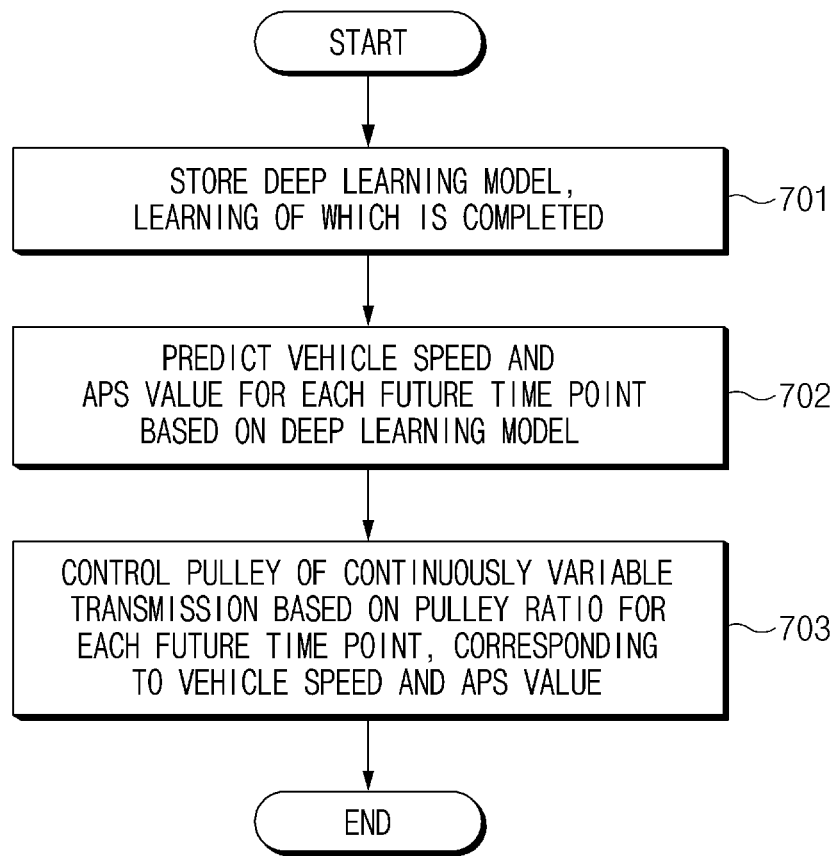
FIG. 7 is a flowchart illustrating a method for controlling a pulley of a continuously variable transmission according to various exemplary embodiments of the present invention.

FIG. 7 is a flowchart illustrating a method for controlling a pulley of a continuously variable transmission according to various exemplary embodiments of the present invention.

First of all, in operation 701, a storage 31 of FIG. 3 may store a deep learning model, the learning of which is completed.

In operation 702, a controller 32 of FIG. 3 may predict a vehicle speed and an APS value for each future time point based on the deep learning model.

In operation 703, the controller 32 may control a pulley of a continuously variable transmission based on a pulley ratio for each future time point, corresponding to the vehicle speed and the APS value.

Figure 8:
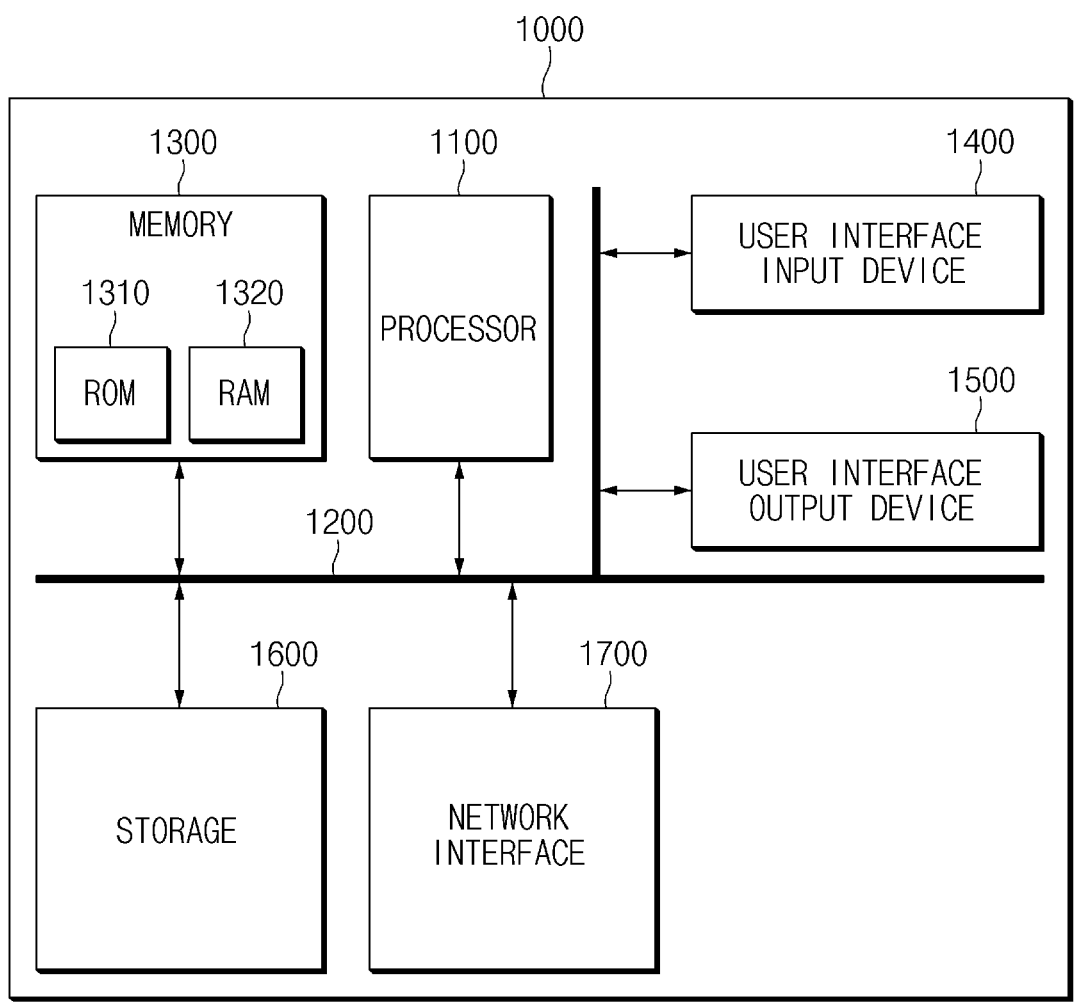
FIG. 8 is a block diagram illustrating a computing system for executing a method for controlling a pulley of a continuously variable transmission according to various exemplary embodiments of the present invention.

FIG. 8 is a block diagram illustrating a computing system for executing a method for controlling a pulley of a continuously variable transmission according to various exemplary embodiments of the present invention.

Referring to FIG. 8, the above-mentioned method for controlling the pulley of the continuously variable transmission according to various exemplary embodiments of the present invention may be implemented by the computing system. A computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, an SSD (Solid State Drive), a removable disk, and a CD-ROM. The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The apparatus of controlling the pulley of the continuously variable transmission and the method therefore may be provided to predict a vehicle speed and an accelerator position sensor (APS) value for each future time point based on the deep learning model, the learning of which is completed, and control the pulley of the continuously variable transmission based on a pulley ratio corresponding to the predicted vehicle speed and the predicted APS value, thus preventing a reverse control phenomenon of the pulley ratio and preventing a tension of the belt in the continuously variable transmission from being increased.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling a pulley of a continuously variable transmission, the apparatus comprising:
   a non-transitory storage configured for storing a deep learning model, learning of which is completed; and
   a controller configured to predict a vehicle speed and an accelerator position sensor (APS) value for each future time point based on the deep learning model and to control the pulley of the continuously variable transmission based on a pulley ratio for each future time point, the pulley ratio corresponding to the predicted vehicle speed and the predicted APS value.

2. The apparatus of claim 1, wherein the controller is configured to maintain a current pulley ratio during a reference time, when a number of pulley ratios higher than the current pulley ratio above a threshold among pulley ratios for every future time points is greater than a reference value, at a downward control time point of the current pulley ratio.

3. The apparatus of claim 1, wherein the controller is configured to upwardly control a current pulley ratio, when a number of pulley ratios higher than a current pulley ratio above a threshold among pulley ratios for every future time points is greater than a reference value, in a state where a current gear stage is maintained.

4. The apparatus of claim 3, wherein the controller is configured to increase the current pulley ratio in proportion to the APS value.

5. The apparatus of claim 1, wherein the deep learning model is a variational auto-encoder (VAE)-based deep learning model having an encoder configured to receive time series data for a driving profile prior to a predicted time point and a decoder configured to predict a speed of a vehicle and an APS value based on a low-dimensional variable, which is an output of the encoder, and a vehicle speed, an APS value, and a driving profile at the predicted time point.

6. The apparatus of claim 5, wherein the driving profile includes at least one of a gas pedal position (GPP) value, engine revolutions per minute (RPM), a pulley ratio, a vehicle speed, a gradient of a road, a curvature of the road, a steering angle, a brake pedal position (BPP) value, a separation distance from a preceding vehicle, a relative speed with the preceding vehicle, information related to traffic lights in front, or an APS value.

7. The apparatus of claim 5, wherein the deep learning model outputs a vehicle speed in a form of time series data and an APS value in a form of time series data.

8. The apparatus of claim 5, wherein the encoder models a feature of the time series data for the driving profile prior to the predicted time point as a low-dimensional variable distributed in a first region.

9. A method for controlling a pulley of a continuously variable transmission, the method comprising:
   storing, by a non-transitory storage, a deep learning model, learning of which is completed;
   predicting, by a controller, a vehicle speed and an accelerator position sensor (APS) value for each future time point based on the deep learning model; and
   controlling, by the controller, the pulley of the continuously variable transmission based on a pulley ratio for each future time point, the pulley ratio corresponding to the predicted vehicle speed and the predicted APS value.

10. The method of claim 9, wherein the controlling of the pulley of the continuously variable transmission includes:
    maintaining a current pulley ratio during a reference time, when a number of pulley ratios higher than the current pulley ratio above a threshold among pulley ratios for every future time points is greater than a reference value, at a downward control time point of the current pulley ratio.

11. The method of claim 9, wherein the controlling of the pulley of the continuously variable transmission includes:
    upwardly controlling a current pulley ratio, when a number of pulley ratios higher than a current pulley ratio above a threshold among pulley ratios for every future time points is greater than a reference value, in a state where a current gear stage is maintained.

12. The method of claim 11, wherein the upwardly controlling of the current pulley ratio includes:
    increasing the current pulley ratio in proportion to a change rate of the APS value.

13. The method of claim 9, wherein the deep learning model is a variational auto-encoder (VAE)-based deep learning model having an encoder configured to receive time series data for a driving profile prior to a predicted time point and a decoder configured to predict a speed of a vehicle and an APS value based on a low-dimensional variable, which is an output of the encoder, and a vehicle speed, an APS value, and a driving profile at the predicted time point.

14. The method of claim 13, wherein the driving profile includes at least one of a gas pedal position (GPP) value, engine revolutions per minute (RPM), a pulley ratio, a vehicle speed, a gradient of a road, a curvature of the road, a steering angle, a brake pedal position (BPP) value, a separation distance from a preceding vehicle, a relative speed with the preceding vehicle, information related to traffic lights in front, or an APS value.

15. The method of claim 13, wherein the deep learning model outputs a vehicle speed in a form of time series data and an APS value in a form of time series data.

16. The method of claim 13, wherein the encoder models a feature of the time series data for the driving profile prior to the predicted time point as a low-dimensional variable distributed in a first region.

* * * * *